UNITED STATES PATENT OFFICE.

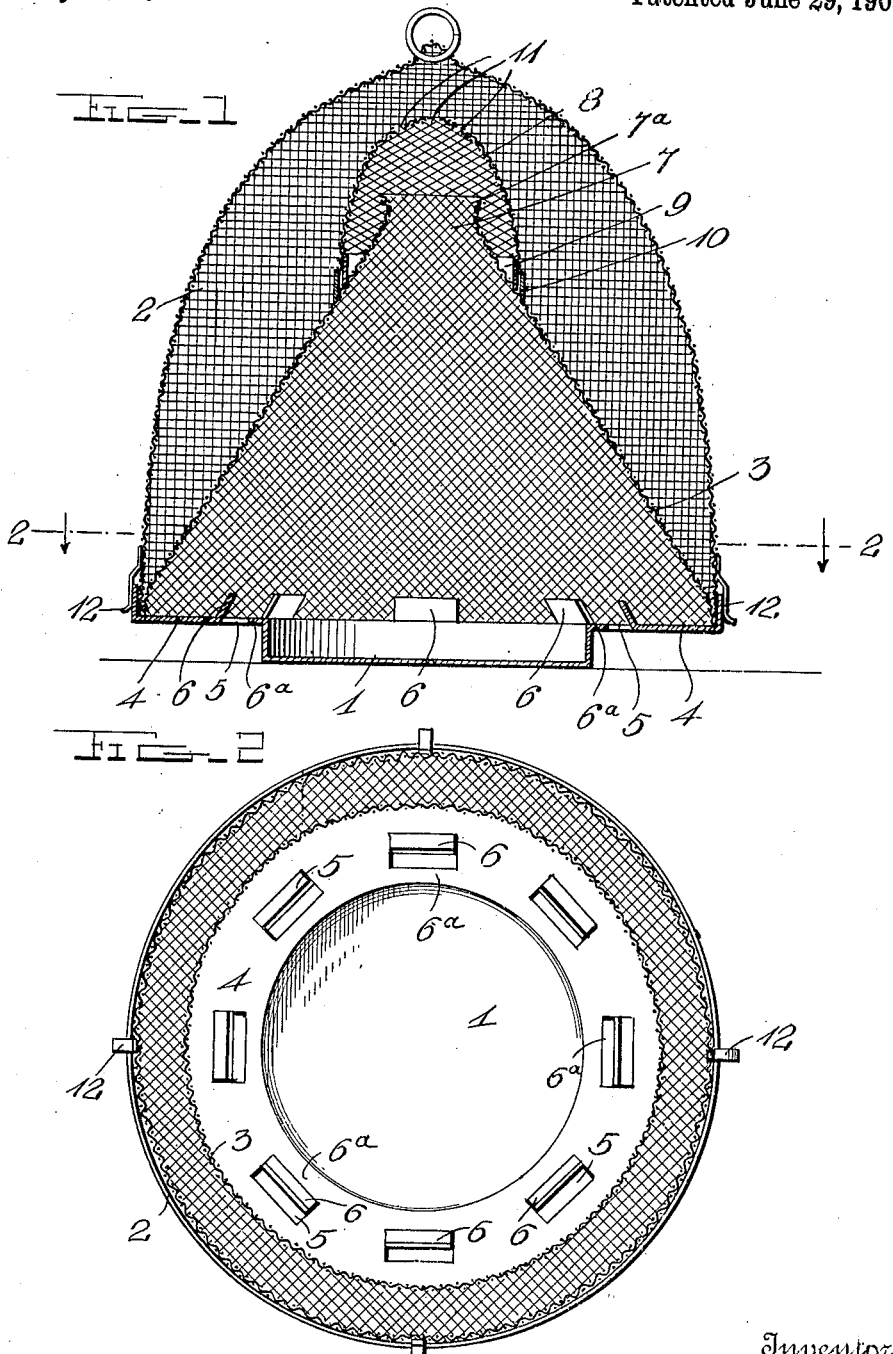

WILLIAM ENGELBRECHT, OF CISSNA PARK, ILLINOIS.

FLY-TRAP.

No. 926,323.   Specification of Letters Patent.   Patented June 29, 1909.

Application filed July 23, 1908.   Serial No. 444,967.

*To all whom it may concern:*

Be it known that I, WILLIAM ENGELBRECHT, a citizen of the United States, residing at Cissna Park, in the county of Iroquois and State of Illinois, have invented certain new and useful Improvements in Fly-Traps; and I do declare the following to be a full, clear, and exact description of the invention, such as will enable others skilled in the art to which it appertains to make and use the same.

This invention relates to improvements in fly traps.

It has for the object to insure the effective entrapping of flies in a simple and economical manner.

With the foregoing and other objects in view, the invention consists of certain novel features of construction, combination and arrangement of parts, as will be more fully described and particularly pointed out in the appended claim.

In the accompanying drawing illustrating the preferred embodiment of my invention, Figure 1 is a sectional elevation thereof; Fig. 2 is a horizontal section taken on the line 2—2 of Fig. 1.

In carrying out my invention I provide a base member or pan 1 and inner and outer wire woven or screen members 2, 3, the members 2 being preferably rounding or dome-shaped in general outline and supported upon the first referred to member or pan while the member 3 is preferably conical or tapering in general outline. The member or pan 1 is provided in its flanged portion 4 with numerous openings 5, serving as fly entrances, the metal punched up in forming the same being utilized as offsets or baffles, designated as 6, more especially designed to baffle the attempt of the flies returning or leaving the trap through said openings, said openings being arranged in a plane above the bottom of the pan or member 1.

The member or cone 3 has an opening 7 of relatively large area in its tapered upper end or apex and upon said member is adapted to be arranged a much smaller wire woven or screen member 8, preferably of like general outline as member 2 and suitably superposed with relation to and resting upon said latter member and which, it is apparent, is thus adapted to be readily removed when desired for cleaning or other purposes.

The member or cone 3 has its upper end outturned around its opening 7 to form a baffle 7ª at that point as against the flies, entering the member 8, returning or descending through said opening into the member 3. The member 8 has suitably secured thereto, around its bottom edge, what may be termed a reinforcing annulus or ring 9; and upon the member or cone 3 is secured or soldered, a suitable distance below its upper open end, an upstanding ring or annulus 10 around which fits said ring or annulus 9 as the member 8 is superposed in position upon the member 3 for suitable retention of the member 8 in place upon the latter. The cone 8 has a small hole 11, or a number of such holes, in its apex for the passage or delivery of the flies therefrom into the entrapping chamber or member 2.

The bait being placed in the member or pan 1, upon its bottom, the flies will be attracted thereby and, entering the trap through the openings 5, will accordingly descend into said pan and after satiation, fly upwardly into the cone or member 3. The entrance-openings 5, however, being guarded by the baffles 6 and ledges 6ª at the opposite edges of said entrance-openings, any attempt of the flies to escape in that direction will be accordingly thwarted or baffled. Their flight or movement will be naturally upward in their further attempt to escape whence their passage will be directed through the opening 7 of the cone or member 3, and, although, after such passage or movement, they will hesitate and adopt dilatory tactics, as against passing through the contracted opening or openings 11 in the apex end of the member 8, they will, however, being thus baffled against flight in any other direction, finally pass upwardly through said contracted opening or openings, and thereby be practically forced or delivered into the entrapping chamber 2.

The cage or member 2 is equipped at its lower end or base with spring clasps 12 adapted to effect the convenient retention of the cage in suitable position upon the base member 1, as against its casual or accidental displacement and whereby it may be readily removed particularly for sanitary purposes.

From the foregoing arrangement and combination of parts, it will be noted that an exceedingly simple, inexpensive and readily adjusted trap for destroying flies is provided and one whose parts are readily assembled and disassembled as occasion may require as for cleaning purposes and for shipment.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claim.

I claim as my invention:—

In a device of the class described, an apertured base, a foraminous cone seated upon said base and having a flaring aperture at its apex, a ring secured to said cone below the apex, a foraminous guard having a ring secured to its base and seated upon said cone inside of the ring, said guard having a plurality of apertures in its upper end, a foraminous casing surrounding the cone and having a supporting projection pressed in its body at the apex thereof, resilient clips carried by said casing for removably attaching same to the base, and a ring passing through the supporting projection formed on the casing and adapted to form a suspension device.

In testimony whereof I have hereunto set my hand in presence of two subscribing witnesses.

WILLIAM ENGELBRECHT.

Witnesses:
JOHN E. BEESON,
E. L. WIESE.